United States Patent [19]
Bauer et al.

[11] 3,811,840
[45] May 21, 1974

[54] TEST DEVICE FOR DETECTING LOW CONCENTRATIONS OF SUBSTANCES IN FLUIDS

[75] Inventors: Robert Bauer, Bristol; Richard Gordon Rosenfield, South Bend; Chauncey Orvis Rupe, Elkhart, all of Ind.

[73] Assignee: Miles Laboratories, Inc., Elkhart, Ind.

[22] Filed: Apr. 1, 1969

[21] Appl. No.: 811,935

[52] U.S. Cl. ......... 23/253 TP, 23/230 R, 23/230 B, 195/103.5 C
[51] Int. Cl.. G01n 31/14, G01n 33/00, G01n 33/16
[58] Field of Search ..................... 23/253 TP, 230 B; 116/114 AM

[56] References Cited
UNITED STATES PATENTS

| | | | |
|---|---|---|---|
| 3,690,836 | 9/1972 | Buissiere et al. | 23/253 TP |
| 2,385,471 | 9/1945 | Scharer | 23/230 R |
| 3,689,224 | 9/1972 | Agnew et al. | 23/253 TP |
| 2,785,057 | 3/1957 | Schwab et al. | 23/253 TP |
| 3,018,611 | 1/1962 | Biritz | 23/253 TP X |
| 3,261,668 | 7/1966 | Natelson | 23/253 TP |
| 3,290,228 | 12/1966 | Gretton et al. | 23/253 TP X |
| 3,420,205 | 1/1969 | Morison | 23/253 TP X |
| 3,449,080 | 6/1969 | Edwards | 23/253 TP X |
| 3,468,636 | 9/1969 | MacLeod | 23/253 TP |

*Primary Examiner*—Joseph Scovronek

[57] ABSTRACT

Test device for detecting low concentrations of substances in test fluids comprising an absorbent wick having a substantially flat surface portion enclosed in a fluid impervious sheath having an aperture of predetermined limited area formed therein, the aperture being contiguous to and exposing a predetermined limited area of the flat surface portion of the wick, which portion is incorporated with a reagent specifically reactable with the substance being detected. In use the device is immersed into the test fluid so that the aperture is submerged and the device, allowed to remain therein while the test fluid contacts the reagent area adjacent to the aperture and migrates into the remainder of the wick. The reagent is immobilized with respect to the liquid. The sheath adjacent to the wick is opaque.

8 Claims, 10 Drawing Figures

PATENTED MAY 21 1974

3,811,840

INVENTORS
ROBERT BAUER
RICHARD G. ROSENFIELD
CHAUNCEY O. RUPE
BY Harry J. Stephenson
ATTORNEY

TEST DEVICE FOR DETECTING LOW CONCENTRATIONS OF SUBSTANCES IN FLUIDS

BACKGROUND OF THE INVENTION

In recent years, numerous simplified test systems have been developed for the rapid detection of various constituents in biological and industrial fluids. These systems or test devices in their simplest form usually involve the combination of a test reagent specifically reactable with the constituent or substance being detected to give a visual response thereto and a carrier for said test reagent. The most common and simplest of these test devices utilizes bibulous paper as the carrier and a portion thereof is impregnated with a solution of the test reagent and dried. In use, the portion of the paper containing the test reagent is momentarily immersed into or otherwise contacted by the fluid being tested, and is observed visually or instrumentally for the specific response which indicates the presence or absence of the substance being detected. These test devices are called "dip and read" by those skilled in the art. As used herein, the term detecting or detection is defined to include the qualitative as well as quantitative estimation of the substance or constituent in question.

Although these simple and rapid test systems have been designed to give extremely sensitive test reactions, on occasion it has been found that the substance being detected was simply not present in a sufficient quantity or concentration to cause a detectable response when the test reagent was immersed into and removed from the fluid being tested. Moreover, in such test devices sensitivity is usually dependent solely upon the test reagent composition and not upon the particular construction of the test device. In using these prior art test systems for detecting low concentrations of substances, it is therefore necessary that an extra manipulative step be added to the testing procedure, such as, for example, concentrating the test solution by removing a part of the fluid prior to utilizing the reagent impregnated "dip and read" test device. This, of course, complicates the procedure and involves the necessary utilization of laboratory equipment. Moreover, heat labile substances require a low temperature evaporation procedure which further delays the test result. Needless to say, in mass testing or screening programs the extra manipulative step or steps results in a great loss in efficiency.

OBJECTS OF THE PRESENT INVENTION

It is therefore an object of the present invention to provide a simple and convient method for detecting extremely low concentrations of substances in fluids.

It is another object to provide a simple test device whereby the test reagent portion thereof is completely enclosed in a stabilizing protective sheath.

It is still another object to provide a test device in which at least a portion thereof is reusable.

Another object is to provide a test device having means whereby the substance being detected may be concentrated in a portion of the device and the portion subsequently removed therefrom for processing separately.

SUMMARY OF THE INVENTION

It has now been found that the above and other objects are achieved simply and rapidly by utilizing an absorbent wick having a substantially flat surface portion enclosed in a fluid impervious sheath having an aperture therein. A reagent specifically reactable with the substance to be detected is incorporated with a flat surface portion of the wick exposed within the aperture in a manner such that when the aperture is immersed into the fluid being tested, the fluid contacts the test reagent as it flows into and is absorbed by the wick. In its simplest form, a piece of bibulous filter paper of sufficient porosity and capillary affinity to cause the fluid being tested to migrate into the paper is coated or otherwise incorporated with a reagent specifically reactable with the substance to be detected, and the wick is enclosed in a fluid impervious sheath having an aperture in the area thereof overlying the portion of the paper incorporated with the test reagent. When the device is immersed into a fluid to be tested, the amount or volume of test fluid contacting the reagent at the aperture is substantially more than would contact said reagent if the paper were immersed in the test fluid in unsheathed condition, and is dependent upon the capacity of the wick to absorb the test reagent. The net result of using such a test device is that a substantially greater volume of the substance being detected is made available for contact with the test reagent than could be achieved by using a simple "dip and read" test device. Thus, lower concentrations of substances may be detected in the test fluid.

DESCRIPTION OF THE PREFERRED EMBODIMENTS

As used hereinafter, the following definitions of terms apply: reagent is defined as a chemical composition or compound which is specifically reactable with a particular substance to either immediately, or, after the addition of other chemicals thereto or manipulation thereof, give an observable or detectable response to the presence of said substance; test fluid is defined as any liquid medium, aqueous or non-aqueous, to be assayed for the presence or absence of the substance to be detected; wick is defined as an integral or non-integral means used to retain the reagent and absorb the test fluid; sheath is defined as the means used to enclose the wick and to direct the fluid being tested through the wick in a defined manner; aperture is defined as an opening in the sheath, preferably planar, which permits fluid flow into the wick through the portion thereof exposed at said aperture, such that flow of the test fluid into the wick is channeled and controlled.

FIGS. 1, 3, 5, and 8 are front views of specific embodiments of the present invention;

FIGS. 2, 4, 6 and 9 are longitudinal sectional views taken along the lines 2, 4, 6 and 9 respectively of FIGS. 1, 3, 5 and 8 respectively.

Figures 5, 6, 7:
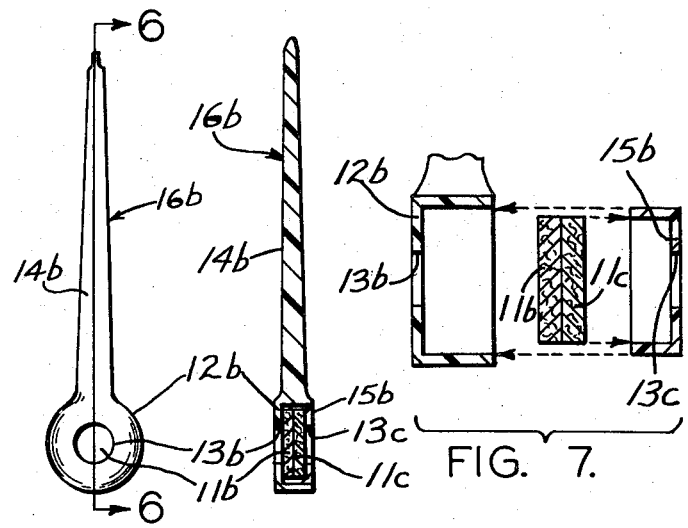
Figure 8:
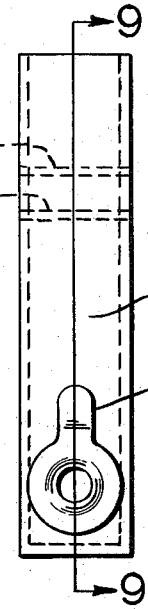
Figures 9, 10:
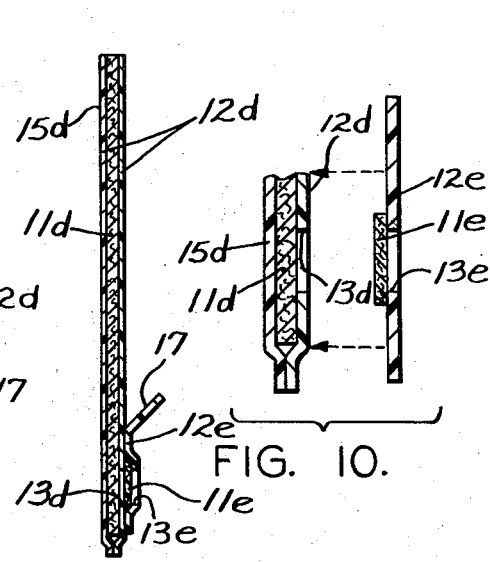

FIG. 7 is an enlarged exploded sectional view of a portion of the device shown in FIGS. 5 and 6; and FIG. 10 is an enlarged exploded sectional view of a portion of the device shown in FIGS. 8 and 9.

Figure 1:
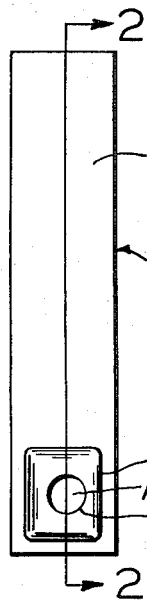
Figure 2:
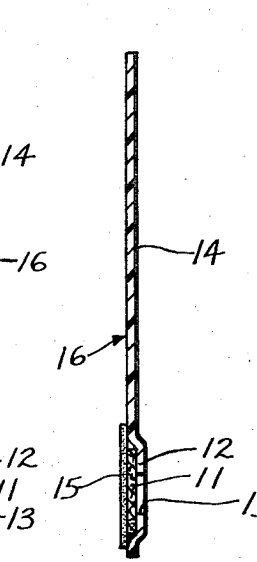

Referring now specifically to the drawing, FIGS. 1 and 2 represent a form of the invention wherein an elongated flat rectangular member 16 of plastic or other suitable material is formed with a rectangular offset well portion 12 at one end and with an integral handle portion 14. A wick 11 in the form of a square of bibulous paper is positioned in the well and secured therein by means of a piece of pressure sensitive cellulose or plastic adhesive tape 15 which completely covers wick 11, and with well portion 12, forms a sheath for said wick. An aperture 13 in member 16 is positioned in the center of the well portion 12 and is contiguous to the wick 11 which is impregnated throughout with a reagent.

Figure 3:
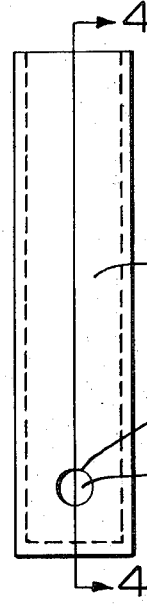
Figure 4:
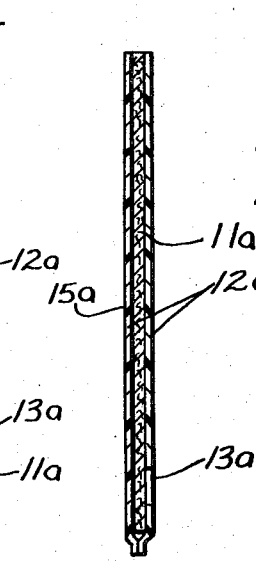

FIGS. 3 and 4 represent a form of the invention wherein an elongated wick member 11a is laminated between two elongated strips 12a and 15a of plastic or other suitable material sealed, as by adhesive or heat sealing, along both side edges and one end edge to form a sheath for said wick. A reagent is impregnated into the end portion of the wick 11a adjacent to the sealed end of the sheath and an aperture 13a is formed in the strip 12a at the same end of the sheath.

FIGS. 5 and 6 show a device wherein a member 16b of plastic or other suitable material is formed with a cylindrical cup shaped well portion 12b and a handle portion 14b. Positioned within the well portion 12b is a pair of laminated disc shaped wick members 11b and 11c which are held in place by a cylindrical cup-shaped member 15b, having a telescopic friction fit within the well portion 12b as shown to provide a sheath for said wick members. The wick members 11b and 11c are each impregnated with a separate reagent composition, and the well portion 12b and member 15b are formed with apertures 13b and 13c as shown. FIG. 7 is an exploded view showing how the laminated wick members 11b and 11c can be inserted into the cup-shaped sheath member 12c and this composite fitted into the well portion 12b. In use the apertures 13b and 13c permit the passage of test fluid into the wick portion 11b and 11c respectively. After use, wick members 11b and 11c may be replaced by fresh wick members in the sheath provided by members 12b and 15b.

FIGS. 8, 9 and 10 depict a device similar to that shown in FIGS. 3 and 4 except that the reagent is incorporated into a detachable wick portion 11e, and the wick portion 11d need not be incorporated with reagent. The detachable wick portion 11e is affixed to a piece of pressure sensitive adhesive tape 12e which with the strip member 12d to which it is attached forms a sheath for wick member 11e which is positioned over the aperture 13d in strip 12d. The tape 12e is formed with an aperture 13e as shown and may be circular in shape and provided with a tab portion 17 for ease of removal. In use, fluid to be tested flows through aperture 13e, wick member 11e, aperture 13d and into the wick member 11d. After predetermined saturation of wick member 11d, tape member 12e with wick member 11e attached thereto is peeled from the strip 12d for further processing if needed. Wick member 11d may have incorporated therein a horizontal line of a fluid sensitive chemical 18 and 19 which indicates that the fluid being detected has saturated the wick member 11d to the extent indicated by the chmical line.

The wick material used may be any of numerous absorbent materials both natural and synthetic. These substances are characterized by their ability to absorb a fluid by capillary attraction or affinity such that the fluid contacting the substance is drawn into the body or structure and is retained therein until the wick substance is saturated. Those skilled in the art of using such substances often refer to these materials as bibulous, that is, having the ability to "drink" the fluid coming in contact therewith. Such substances include, inter alia, absorbent paper, such as filter paper, cloth, fibrous synthetic polymers, processed wood, certain clay like substances, polymeric gels which have been processed to form membrane structures, and the like.

The sheaths of the test devices disclosed may be constructed of any of various suitable fluid impervious plastic or polymeric film-forming materials. If the fluid being tested is aqueous in nature, the sheath may be constructed of any of the numerous water impervious resinous film-forming materials such as, for example, polyethylene, polypropylene, polyvinyl chloride, polyvinyl acetate, polyamide, polyethylene terephthalate and various combinations thereof. When the fluid being tested comprises an organic solvent or contains a highly reactive chemical such as a concentrated acid, the sheath as well as the wick material must obviously be able to withstand contact therewith.

As far as the overall construction or physical structure of the present test device is concerned, a great number of variations may be made without departing from the scope or spirit of the inventive concept disclosed herein. Basically, the wick is enclosed in a sheath provided with aperture means of predetermined area through which the test fluid can flow. A chemical reagent or reagent system is associated with the wick and with the sheath aperture in such a manner that the fluid being tested, on passing through the aperture, contacts the reagent in the area of the wick exposed at the aperture. As far as the reagent and wick are concerned, the reagent may simply be incorporated therewith such as, for example, by impregnation with a solution of the reagent, followed by drying. Alternatively, the reagent may be added as a separate entity to the wick such as by using a separate reagent-impregnated paper disc over the wick portion at the area of the sheath aperture. At any rate, the reagent need only be incorporated with the wick in the vicinity of the sheath aperture, since the fluid being tested must flow through this area and then by capillary affinity, migrate into the body of the wick, causing additional test fluid to pass through the aperture and contact the reagent.

As noted above, the wick and reagent may be separate entities so long as they are in contiguous relationship. However, separability of reagent and wicck structure may be especially desirable, for example to allow wick reagent, after contact with the test fluid, to be removed from the wick and separately processed.

In regard to the structural relationship between the reagent, sheath and aperture, the reagent must be placed at the aperture of the sheath in such a manner that the test fluid must pass in contact with the reagent at the aperture in order to migrate into the body of the wick, and must not be able to flow into the wick without contact with the reagent.

It is preferable that at least one of the test device constituents be reasonably rigid in order to facilitate handling of the test device. In this regard, the sheath may advantageously perform the function of adding rigidity to the test device since this constituent is generally polymeric in nature and may easily be made to have this rigidity characteristic. Moreover, the sheath is preferably elongated or otherwise provided with a handle portion to facilitate manipulation of the test device.

The test devices of the present invention are adaptable to a wide variety of test reagent systems. Such test reagent systems include, inter alia, a test for free chlorine in aqueous systems using oxidation-reduction indicators, the detection of normetanepharine and metanepharine in biological fluids, the detection of hypoglycemia by estimating low levels of glucose in body fluids, the detection of bacteriuria by analyzing urine for the absence of glucose, the detection of low concentrations of dissolved solids and minerals in natural waters, and the like.

Exemplary of the many test reagents adaptable to the present invention is the test for free chlorine in aqueous fluids using oxidation-reduction indicator materials. The use of free chlorine as a disinfectant for swimming pool water and other water supplies has been popular for some time. Its popularity is due, in part, to its low cost, convenience and its effectiveness as an antiseptic agent in relatively low concentrations. Its major disadvantages are: (1) in higher than necessary concentrations, it is irritating to the eyes, (2) it has an unpleasant odor and (3) it rapidly dissipates from exposed water, either by escaping as a gas or by reacting with some component in water. In the interest of adequate swimming pool sanitation and pleasant swimming, it is desirable to maintain the free chlorine content thereof somewhere between the lowest effective concentration conducive to good sanitation and the highest concentration that is not irritating to the swimmer. This range is fairly narrow, covering a concentration range of from about 0.4 ppm. to about 2.0 ppm.

In the past oxidation-reduction indicator test systems for detecting free chlorine in swimming pool and drinking water have been primarily of the liquid type, since the extremely low concentration of chlorine present made a "dip and read" test device impractical unless the fluid being detected was somehow concentrated prior to contacting the test device. However, the present test device in combination with an oxidation-reduction indicator material as will be described more fully hereinafter in the examples, provides a simple and convenient test device which is stable and exhibits the desired sensitivity. Such devices are also quick-acting and economical to use.

Another test system which has been found to be adaptable to the present invention is the diazonium coupling reaction for detecting normetanephrine and metanephrine in urine. In this regard it has been found that a test device as described herein not only allows low concentrations of these substances to be detected, but also substantially eliminates interfering constituents found in the fluid being tested. An example of such a test method will follow in the examples.

Still another test system advantageously adapted to the test device of the present invention is the test for bacteriuria using the absence of glucose as an indication of a positive test response. This test system is founded on the theory that bacteria present in the urinary tract will cause a decomposition of the glucose in the urine found therein, and as a result, the urine of an individual suffering from bacteriuria will be devoid of glucose. It will be obvious that such a test system requires a high degree of sensitivity since the normal level of glucose in urine is only about 2–20 mg./100 ml. In the past, commercially available enzymatic "dip and read" tests for glucose in urine were not sufficiently sensitive to detect bacteriuria in this manner, because of the inhibitors present in a normal urine sample. Therefore the urine had to be purified to remove such inhibitor prior to contact with the glucose test reagent. By using the test device of the present invention it has been found that the "absence of glucose" test method can be effectively utilized as a means for detecting urinary bacterial infections (bacteriuria).

As will be evident from the preceding disclosure, a large number of test reagent systems are adaptable for use with the present test device and the above-mentioned systems as well as those in the examples which follow are merely exemplary.

Although the test devices of the present invention may comprise a wide variety of shapes and sizes, a preferable physical embodiment or form is shown in FIG. 1 and involves the use of a square (15 mm. × 15 mm.) of rather thick (about 1 mm.) bibulous paper as the wick 11. The dimensions of the strip 16 of fluid impervious, opaque plastic material are about 20 mm. × 100 mm., and the aperture 13 preferably has a diameter of 5 mm. The wick 11 is incorporated with a test reagent.

Although the physical form of the present test device is not critical, the inter-relationship of the aperture size and the capacity of the wick to absorb fluid is important. In this connection, the volume of fluid contacting the test reagent depends on the size of the aperture and the fluid volume capacity of the wick. Such parameters may be easily adjusted to meet the needs of the specific test system and device being prepared. Generally speaking, in a test device in which the wick has a given volume capacity, as the aperture is made smaller, the ratio of fluid volume to reagent area exposed at the aperture is increased.

In use, the test devices of the present invention are simply dipped into the fluid to be tested, held therein until the wick absorbs the desired amount of fluid or becomes saturated and then withdrawn. The immersion period may be timed, or a chemical indicator may be combined with the wick to give a visual indication of saturation of the wick to the extent desired. This latter embodiment may simply and effectively comprise the utilization of a chemical which gives a visual response to the presence of the fluid being tested, such chemical being placed on the wick in the form of a transverse line or bar. When the fluid being tested is aqueous, the chemical may simply be anhydrous cobalt chloride which changes color from blue to pink when contacted by the aqueous fluid migrating through the wick. This change of color gives a signal that the device should be removed from the fluid being tested.

A more sophisticated and utilitarian signal system may be provided by placing a first line or bar of a colorless chemical across the width at an intermediate portion of the wick and a second colorless chemical bar across the wick at a position further away from the aperture, such that fluid moving along the wick dissolves the chemical in the first bar and carries it into the second bar. A visible chromogenic response results, indicating that the test device should be withdrawn from the fluid being tested. Examples of such first and second chemicals are potassium ferricyanide and ferric ammonium sulfate respectively. Obviously the second bar is placed in a specific position on the wick providing the color reaction when the desired volume of fluid has passed through the aperture and contacted the reagent thereat. Moreover, any number of bars may be utilized in conjunction with the wick to permit absorption thereinto of predetermined volumes of several fluids.

A third and simpler alternative to the above comprises merely allowing the device to remain in the fluid being tested for a period of time in excess of that required to saturate the wick. The obvious drawback of doing this resides in the possibility of leaching the reagent from the device with resulting loss in sensitivity. This, of course, would only happen if the device is allowed to remain in the fluid for a period of time far in excess of that required to carry out a test.

Since the fluid being detected must contact the reagent at the aperture, fluid soluble reagents must be immobilized to prevent solution thereof. This immobilization may be accomplished by any of the known methods of insolubilizing a reagent in a matrix. In an aqueous test system, a simple expedient is to treat the reagent with a material such as starch. Another means of immobilizing the reagent involves treating or coating the reagent and matrix thereof with a semi-permeable membrane or polymeric material which affixes the reagent to the matrix. other suitable means involve chemically or physically bonding the reagent to the wick or matrix, such as for example by using insoluble adsorbents or paper containing insoluble ion-exchange resins.

The following examples are merely descriptive of the present invention and are not intended to place any limitation thereon.

EXAMPLE 1

DETECTION OF FREE CHLORINE IN SWIMMING POOL WATER

Sheets of Eaton-Dikeman No. 301 bibulous paper having a thickness of about 1.0 mm. were impregnated with a solution containing equal volumes of 0.1 percent (weight/volume) vanillinazine in 95 percent ethanol and 0.1 percent (weight to volume) syringaldazine in 95 percent ethanol and dried for 20 minutes at 100°C. The dried moderately faint yellow sheets were cut into 15 mm. × 15 mm. squares. Each square was used in a device of the type shown in FIGS. 1 and 2. The well portion 12 of the device was about 16 mm. × 16 mm. and the aperture 13 thereof had a diameter of 5 mm.

Test devices so produced were then separately immersed for 10 seconds in swimming pool water samples having concentrations of free chlorine of 0.5 ppm. to 2.0 ppm. and withdrawn therefrom. The color of the test reagent area exposed at the aperture changed from yellow to varying intensities of lavender, depending upon the concentration of chlorine in the water. When unsheathed pieces of paper impregnated with the same test reagent were immersed momentarily into the sample containing the 0.5 ppm. free chlorine, the color of the test paper remained yellow.

EXAMPLE 2

Three (3) grams of 2-10 micron silica gel were added to 25 ml. of a 1.0 percent (weight to volume) aqueous solution of leuco crystal violet (LCV), the mixture was slurried for 10 minutes and centrifuged. The supernatant was discarded and 25 ml. of distilled water was added to the residue. The resulting resuspension was agitated and the silica gel containing adsorbed LCV recovered by vacuum filtration and dried under a vacuum at 60°C. for three minutes. About 500 mg (0.5 g.) of the resulting dry powder was again resuspended in 5.0 ml. of a 2 percent (weight/volume) aqueous solution of soluble starch. One (1) drop of the resuspension in starch was added to an end portion of each at several strips of 1.5 cm. × 8 cm. bibulous paper as described in Example 1 and the paper dried under vacuum at 60°C. for twenty minutes. The resulting white paper strips were placed in opaque water impervious plastic sheaths to produce test devices as shown in FIGS. 3 and 4. These test devices had 7.0 mm. diameter apertures.

Test devices thus produced were dipped separately into distilled water and water containing 0.2 ppm. chlorine allowed to remain therein for 6 to 8 seconds and withdrawn. The reagent of the device dipped into the distilled water remained white, whereas the reagent of the aperture of the device dipped into the water containing the 0.2 ppm. chlorine changed to a pale blue color.

It was found that the devices thus prepared (containing LCV adsorbed on silica gel) were able to detect 0.2 ppm. chlorine, while strips containing only LCV were able to detect a minimum of about 5 ppm. chlorine. Unsheathed paper strips impregnated with the LCV adsorbed on silica gel were unreactive to chlorine in the range under consideration, i.e., 0.2 to 2.0 ppm.

EXAMPLE 3

Example 2 was repeated except that a 0.1 percent (weight/volume) solution of 3,3'dimethylnaphthidine in 1.0 normal hydrochloric acid was substituted for the leuco crystal violet. Test devices thus prepared were capable of detecting 0.2 ppm. chlorine in water.

EXAMPLE 4

Example 2 was repeated except that Bio Rad AG1 × 8 resin (a strongly basic quaternary ammonium anion exchange resin) was substituted for the silica gel, and a 1 percent solution of leuco bromphenol blue was substituted for the leuco crystal violet solution. Test devices prepared as described in Example 2 were able to detect 0.5 ppm. chlorine when used as described in that example.

EXAMPLE 5

Example 2 was repeated except that five grams of Cellex-AE (amino ethyl cellulose) were substituted for the silica gel and 50 ml. of one molar potassium iodide were subsituted for the leuco crystal violet. Test devices prepared and used as described in Example 2 were capable of detecting 0.2 ppm. chlorine in water.

EXAMPLE 6

Example 2 was repeated with the exception that 10 ml. of a 1 percent aqueous solution of N,N-diethyl-p-phenylenediamine was mixed with one gram of silica gel to form the test reagent. Test devices thus prepared were able to detect 0.2 ppm. chlorine in water.

EXAMPLE 7

Example 6 was repeated except that o-tolidine was substituted for the N,N-diethyl-p-phenylenediamine. The devices thus prepared were able to detect 0.2 ppm. chlorine in water; however, the blue color thus produced faded rapidly and made quantitation difficult.

EXAMPLE 8

Example 7 was repeated except that the starch solution additionally contained 0.5 percent bis(2-ethyl hexyl) sodium sulfosuccinate. It was found that upon contacting a device thus prepared with an aqueous solution of 0.2 ppm. chlorine, a blue color was produced which persisted for at least five (5) minutes thereby allowing the facile quantitation of chlorine present by means of comparison with a color chart having color blocks representative of various concentrations of chlorine.

EXAMPLE 9

A bibulous paper disc 15 mm. in diameter and about 1.5 mm. thick was impregnated with a reagent as described in Example 1. A second disc having the same dimensions was impregnated with a 0.1 percent aqueous-alcoholic solution of bromthymol blue indicator, the solvent comprising 60 percent ethanol. The second disc containing the bromthymol blue was dried for 12 minutes at 100°C. and laminated to the first disc containing the chlorine sensitive reagent by means of double faced adhesive tape.

The laminated disc was then inserted into a close fitting cup-shaped holder having a diameter of about 16 mm. as shown in FIGS. 5, 6 and 7, said holder being designated as 15b. This composite of wick members 11b and 11c and sheath portion 15b was then inserted into another cup-shaped sheath portion 12b having a handle 14b and an inside diameter such that a friction fit retained the sheath portion 15b and reagent containing wick members 11b and 11c securely in the sheath portion 12b.

When immersed into swimming pool water containing various concentrations of free chlorine the device was able to detect as little as 0.5 ppm. chlorine by viewing the color developed by the reagent exposed in the aperture on the one side of the device and indicated the pH of the water in a range of 6.0 to 7.6 by observing the color change from yellow to blue in the bromthymol blue reagent exposed in the aperture on the other side.

EXAMPLE 10

DETECTION OF METANEPHRINE IN BIOLOGICAL FLUIDS

A piece of bibulous filter paper approximately 1 mm. thick was cut into strips 75 mm. × 13 mm. and two parallel chemical marks were placed on each strip by impregnating the paper in narrow areas with a solution of 0.5 percent by weight of anhydrous cobalt chloride in absolute ethyl alcohol, such areas running across the width of the strips and positioned 20 mm. and 30 mm. respectively, from one end thereof. The paper strip was then sealed between strips of slightly larger, transparent, water-impervious cellulose or plastic-material such as, for example, adhesive tape, one of the strips having a 7 mm. aperture therein positioned on the center line of the paper strip and 20 mm. from the end of the strip opposite the first-mentioned end. FIGS. 8 and 9 illustrate a test device constructed according to this example, the cobalt chloride impregnated areas being shown in dotted lines at 18 and 19.

A disc of filter paper 9 mm. in diameter was impregnated with 45–50 percent by weight of Amberlite IR-120, a strong cation exchange resin. Such a paper may be obtained commercially and is known as Reeve Angle SA-2 ion exchange resin loaded paper. This reagent impregnated paper disc was then concentrically fixed to the adhesive side of a circular piece of water-imprevious adhesive tape having a diameter of about 12 mm. and a central circular aperture 7 mm. in diameter, such that the disc covered the aperture. FIGS. 9 and 10 illustrate a disc 11e attached to a circular piece of tape 12e having a tab portion 17 without exposed adhesive for ease of handling. As shown in FIG. 10, a composite of the tape and paper discs was then adhesively affixed to the outer surface of the apertured strip 12d with the ion-exchange resin impregnated disc 11e concentric with and covering the aperture in the sheath. The peripheral portions of the adhesive tape were pressed firmly in place around the margins of the disc 11e as shown in FIG. 9 so that fluid can enter the wick 11d only through the ion-exchange impregnated disc 11e. While it cannot be conveniently illustrated in the drawing, the disc 11e and wick 11d are in contiguous relationship so that capillary fluid flow therebetween is facilitated.

In practice, the apertured end of the test device of FIGS. 8 and 9 was placed in a urine sample containing 0.5 mg. per ml. metanephrine and allowed to remain in this fluid until the area 19, impregnated with cobalt chloride, changed from blue to pink. The device was then removed from the urine and placed in a small beaker containing sufficient distilled water to cover the aperture and allowed to remain therein until the area 18, impregnated with cobalt chloride, changed from blue to pink. The device was then immediately removed from the distilled water, shaken to remove excess water and the composite of adhesive tape and paper discs 12e and 11e was peeled from the strip 12d by grasping the tab 17. The adhesive side of the tape 12e with the reagent disc 11e still attached thereto was then pressed onto a 15 mm. × 50 mm. strip of cellulose phosphate ion-exchange paper so that the disc 11e was positioned generally in the center thereof. The peripheral portions of the tape 12e were pressed firmly in place around the margins of disc 11e, and the metanephrine contained in the disc 11e was eluted therefrom by adding one drop of 0.1 N sodium hydroxide solution through the aperture 13e. Next, one drop of a stabilized or freshly prepared diazonium salt was applied to the disc through the aperture 13e. Purple bands immediately appeared in the cellulose phosphate paper around the reagent disc indicating the presence of metanephrine in the urine being tested.

EXAMPLE 11

Example 10 was repeated escept that Reeve Angle WA-2 ion-exchange paper, incorporated with 45–50 percent by weight of Amberlite IRC-50, a weak cation exchange resin was substituted for the disc of SA-2 paper.

What is claimed is:

1. A dip-and-read type device for detecting a substance in a liquid which comprises a liquid impervious sheath; a liquid absorbent wick capable of accommodating a predetermined volume of liquid, said wick having a substantially flat surface portion and being enclosed within said sheath, said sheath being formed with an aperture of predetermined limited area contiguous to and exposing to said liquid a predetermined limited area of said flat surface portion of said wick, the entire sheath portion adjacent to the wick being opaque; and a reagent incorporated with the portion of the wick exposed at the aperture, which reagent is immobilized with respect to said liquid and is specifically reactable with said substance to be detected to provide at said aperture a visual response to the presence of said substance in said liquid.

2. A test device as in claim 1 wherein the wick is a bibulous cellulose material.

3. A test device as in claim 2 wherein the cellulose material is paper.

4. A test device as in claim 1 wherein the sheath is a semi-rigid polymeric film selected from the group of substances consisting of polyethylene, polypropylene, polyvinyl chloride, polyvinyl acetate, polyamide, polyethylene terephthalate and various combinations thereof.

5. A test device as in claim 1 wherein a portion of the wick at said aperture is detachable from the remainder of said wick, said detachable portion being incorporated with the said reagent.

6. A test device as in claim 1 wherein said reagent is an ion-exchange resin.

7. A dip-and-read type device for detecting free chlorine in a liquid which comprises a liquid impervious sheath; a liquid absorbent wick capable of accommodating a predetermined volume of liquid, said wick having a substantially flat surface portion and being enclosed within said sheath, said sheath being formed with an aperture of predetermined limited area contiguous to and exposing to said liquid a predetermined limited area of said flat surface portion of said wick, the entire sheath portion adjacent to the wick being opaque; and a reagent incorporated with the portion of the wick exposed at the aperture, which reagent is immobilized with respect to said liquid and is specifically reactable with free chlorine to give a chromogenic response to said aperture to the presence of free chlorine in said liquid.

8. A test device as in claim 7 wherein the reagent is an oxidation-reduction indicator.

* * * * *